(12) United States Patent
Hall et al.

(10) Patent No.: US 7,131,277 B2
(45) Date of Patent: **\*Nov. 7, 2006**

(54) CRYOGENIC VESSEL WITH AN ULLAGE SPACE VENTURI ASSEMBLY

(75) Inventors: Ivan Keith Hall, Baytown, TX (US); Justin Charles Gish, Mobile, AL (US); Karl Palframan, Theodore, AL (US)

(73) Assignee: Harsco Technologies Corporation, Fairmont, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/151,392

(22) Filed: Jun. 13, 2005

(65) Prior Publication Data

US 2006/0037328 A1    Feb. 23, 2006

Related U.S. Application Data

(63) Continuation of application No. 10/671,762, filed on Sep. 26, 2003, now Pat. No. 6,904,758.

(51) Int. Cl.
*F17C 11/00* (2006.01)

(52) U.S. Cl. ...................................... 62/45.1

(58) Field of Classification Search ................ 62/45.1, 62/62, 53.1, 50.4, 53.2; 141/3, 7, 8, 20
See application file for complete search history.

(56) References Cited

U.S. PATENT DOCUMENTS

| | | | | |
|---|---|---|---|---|
| 2,863,297 | A | * | 12/1958 | Johnston .................... 62/45.1 |
| 3,425,585 | A | * | 2/1969 | Latham .................... 220/560.1 |
| 3,602,003 | A | * | 8/1971 | Hampton .................... 62/48.2 |
| 3,632,235 | A | | 1/1972 | Grenci |
| 3,764,036 | A | * | 10/1973 | Dale et al. ............. 220/560.05 |
| 3,946,572 | A | * | 3/1976 | Bragg ........................ 62/50.1 |
| 4,027,494 | A | * | 6/1977 | Fletcher et al. ............. 62/48.3 |
| 4,723,573 | A | * | 2/1988 | Burnett ...................... 137/587 |
| 5,335,503 | A | | 8/1994 | Lee |
| 5,357,758 | A | | 10/1994 | Andonian |
| 5,386,845 | A | * | 2/1995 | Zink .......................... 137/350 |
| 5,398,515 | A | * | 3/1995 | Lak ............................ 62/47.1 |
| 5,404,918 | A | | 4/1995 | Gustafson |
| 5,421,161 | A | | 6/1995 | Gustafson |
| 5,438,837 | A | * | 8/1995 | Caldwell et al. ............. 62/50.1 |
| 5,456,084 | A | | 10/1995 | Lee |
| 5,520,004 | A | * | 5/1996 | Jones, III ...................... 62/63 |
| 5,715,688 | A | | 2/1998 | Jones, III |
| 5,765,555 | A | | 6/1998 | Garrett |
| 6,012,453 | A | | 1/2000 | Tsals et al. |
| 6,073,437 | A | * | 6/2000 | Jones .......................... 60/204 |

(Continued)

FOREIGN PATENT DOCUMENTS

GB        2342647 A  *  4/2000

(Continued)

*Primary Examiner*—Mohammad M. Ali
(74) *Attorney, Agent, or Firm*—David C. Jenkins; Eckert Seamans Cherin & Mellott, LLC

(57) ABSTRACT

A cryogenic vessel includes a first, outer vessel assembly having an outer vessel and a liquid fill line assembly and a second, ullage space vessel having a bottom and disposed within the first, outer vessel, adjacent to the top of the first, outer vessel. The liquid fill line assembly has a venturi assembly adjacent the bottom of the ullage space vessel. The venturi assembly is structured to create a low pressure zone, relative to the ullage space vessel, during a fill procedure whereby, during a fill procedure, fluid is drawn from within the ullage space vessel into the fill line assembly.

8 Claims, 5 Drawing Sheets

U.S. PATENT DOCUMENTS

| | | |
|---|---|---|
| 6,086,833 A | 7/2000 | Conners et al. |
| 6,090,427 A | 7/2000 | Mazurek et al. |
| 6,119,465 A | 9/2000 | Mullens |
| 6,128,908 A | 10/2000 | Gustafson |
| 6,230,516 B1 | 5/2001 | Andonian |
| 6,334,312 B1 | 1/2002 | Mack et al. |
| 6,354,088 B1 | 3/2002 | Emmer et al. |
| 6,659,730 B1 * | 12/2003 | Gram et al. .................. 417/53 |

FOREIGN PATENT DOCUMENTS

| | | |
|---|---|---|
| WO | WO 02/060647 | 8/2002 |

* cited by examiner

CRYOGENIC VESSEL WITH AN ULLAGE SPACE VENTURI ASSEMBLY

CROSS REFERENCE TO RELATED APPLICATION

The present application is a continuation of Ser. No. 10/671,762 application based on U.S. Pat. No. 6,904,758, filed Sep. 26, 2003.

BACKGROUND OF THE INVENTION

1. Field of the Invention

This invention relates to a cryogenic vessel having an interior ullage vessel and, more specifically, to a cryogenic vessel having an interior ullage vessel that includes a venturi assembly with a fill line passing therethrough or coupled thereto.

2. Background Information

Cryogenic liquids, such as liquid natural gas (LNG), nitrogen, oxygen, $CO_2$, hydrogen and the like, are substances that normally exist as gasses, but are liquids at cold temperatures. Special vessels and systems must be used to store and transfer cryogenic liquids because of difficulty in maintaining the extremely cold temperatures. Such vessels typically include a double walled vessel having a vacuum in the annulus or plenum. While the vacuum provides an effective insulation, the insulation is not perfect and, as such heat penetrates the vessel. When heat is added to the cryogenic liquid, a portion of the liquid returns to the gaseous state. The gas within the vessel increases the internal pressure. Eventually, to prevent over pressurization of the vessel, the gas must be vented. It is desirable to prevent, or at least delay, the venting of the gas.

One means of delaying the over pressurization of the vessel was to not completely fill the vessel with the cryogenic liquid. That is, vessels were filled by spraying the cryogenic liquid into the top of the tank via a nozzle. This spray would condense the gas in the tank and collapse the pressure head therein. When the pressure head collapsed, the pressure in the tank was substantially reduced so that the cryogenic liquid could flow into the tank. The cryogenic liquid flowed into the tank until the cryogenic liquid submerged the nozzle. Once the nozzle was submerged, the pressure in the tank would gradually increase because the incoming cryogenic liquid was no longer contacting the gas within the vessel and, therefore, unable to collapse the pressure head. A pressure gage monitored the fill line and the filling procedure was automatically shut-off when the pressure in the tank reached a predetermined value or at a predetermined flow rate reduction. At this point, the vessel was not completely full and an ullage space existed above the level of the cryogenic liquid. The ullage space accommodated any cryogenic liquid that was subsequently vaporized due to heat penetration. Because the newly vaporized gas had a space to fill, the hold time of the tank was increased and venting was delayed.

Because monitoring pressure in the fill line to determine when the tank was filled to the proper point does not always result in the vessel being filled to the same level, this system was improved by the addition of an ullage space vessel. The ullage space vessel was essentially another vessel having a small opening therein, and which was disposed within the cryogenic vessel. During the fill procedure, the small opening in the ullage space vessel prevented the ullage space vessel from being filled as rapidly as the cryogenic vessel. That is, a small amount of cryogenic fluid would seep into the ullage space vessel at a slow rate. This addition of cryogenic liquid to the ullage space vessel, as well as the fact the ullage space vessel was surrounded by the cryogenic liquid, caused the pressure head in the ullage space vessel to collapse. When the cryogenic vessel was filled completely, the cryogenic liquid would back up the fill line causing a very noticeable increase in pressure and a decrease in the fill rate. At this point the fill procedure stopped. Thus, the cryogenic vessel was completely filled while the ullage space vessel was, essentially, empty. The cryogenic liquid would continue to seep into the ullage space tank until the fill levels were essentially even. As the liquid seeped into the ullage space vessel, an ullage space was created above the cryogenic liquid. This ullage space, as well as any vapor space in the ullage space vessel, provided a space for any vaporizing liquid to expand.

This system, however, also has disadvantages. For example, when a vessel being refilled is not completely empty, the cryogenic fluid in the ullage space vessel is at the same level as the cryogenic liquid in the storage space. Thus, the vapor space of the vessel is reduced. This limits the size of the final ullage space and may require subsequent venting of gas.

There is, therefore, a need for a cryogenic vessel with an ullage vessel structured to drain any residual liquid while resisting filling with a liquid during the filling procedure.

There is a further need for a cryogenic vessel with an ullage vessel having a fill line with a venturi assembly thereon structured to draw liquid from the ullage vessel during the filling procedure.

SUMMARY OF THE INVENTION

These needs, and others, are met by the present invention that provides a cryogenic vessel with an ullage vessel and having a fill line with a venturi assembly thereon structured to draw liquid and vapor from the ullage vessel during the filling procedure. The ullage space vessel is, preferably, mounted at the top of the cryogenic vessel. During the initial fill, the ullage space vessel is substantially empty. When the cryogenic vessel is re-filled, however, the ullage space vessel is likely to have a quantity of cryogenic liquid therein. This ullage space vessel cryogenic liquid gathers at the bottom of the ullage space vessel. The fill line for the cryogenic vessel passes through the ullage space vessel and exits the ullage space vessel at a low, and preferably the lowest, point or is coupled to the lowest point. At the point where the fill line exits the ullage space vessel, there is a venturi assembly. The venturi assembly includes a tubular collar wherein the inner surface of the collar defines a conduit having a diameter that is smaller than the fill line diameter. The tubular collar further includes a venturi opening extending from the outer surface of the collar to the conduit. The venturi opening is disposed adjacent to the bottom of the ullage space vessel.

In operation, when the cryogenic liquid flows through the fill line, the shape of the venturi assembly causes the speed of the flow to increase as the flow passes through the conduit. The speed of the cryogenic liquid through the venturi assembly creates a low pressure zone. This low pressure zone causes liquid to be drawn from the ullage space vessel through the venturi opening into the fill line. This action causes the ullage space vessel to be actively drained during the filling procedure thereby assuring the ullage space vessel is substantially empty at the end of the filling procedure. After the cryogenic fluid is removed from the ullage space vessel, the venture assembly further draws any high pressure, or saturated, vapor into the fill line. The cryogenic liquid surrounding the ullage space cause the pressure head in the ullage space vessel to collapse. Thus, the ullage space vessel may be used to accommodate any gas that is evaporated from the cryogenic liquid during storage of the liquid. After the filling procedure is complete, any additional cryogenic liquid in the fill line drains from the fill line through the venturi opening into the ullage space vessel. Additionally gravity will cause cryogenic liquid to backflow through the fill line and through the venturi opening into the ullage space vessel until the liquid level in the cryogenic vessel and the ullage space vessel are in equilibrium. Additionally, if cryogenic liquid is withdrawn from through the fill line, a similar low pressure zone is created in the venture assembly causing the ullage space vessel to drain.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As used herein, "fluid" shall mean both a liquid and/or a gas.

As used herein, the "outer vessel" means the vessel outside of the ullage space vessel. The outer vessel may have two or more shells.

Figure 1:
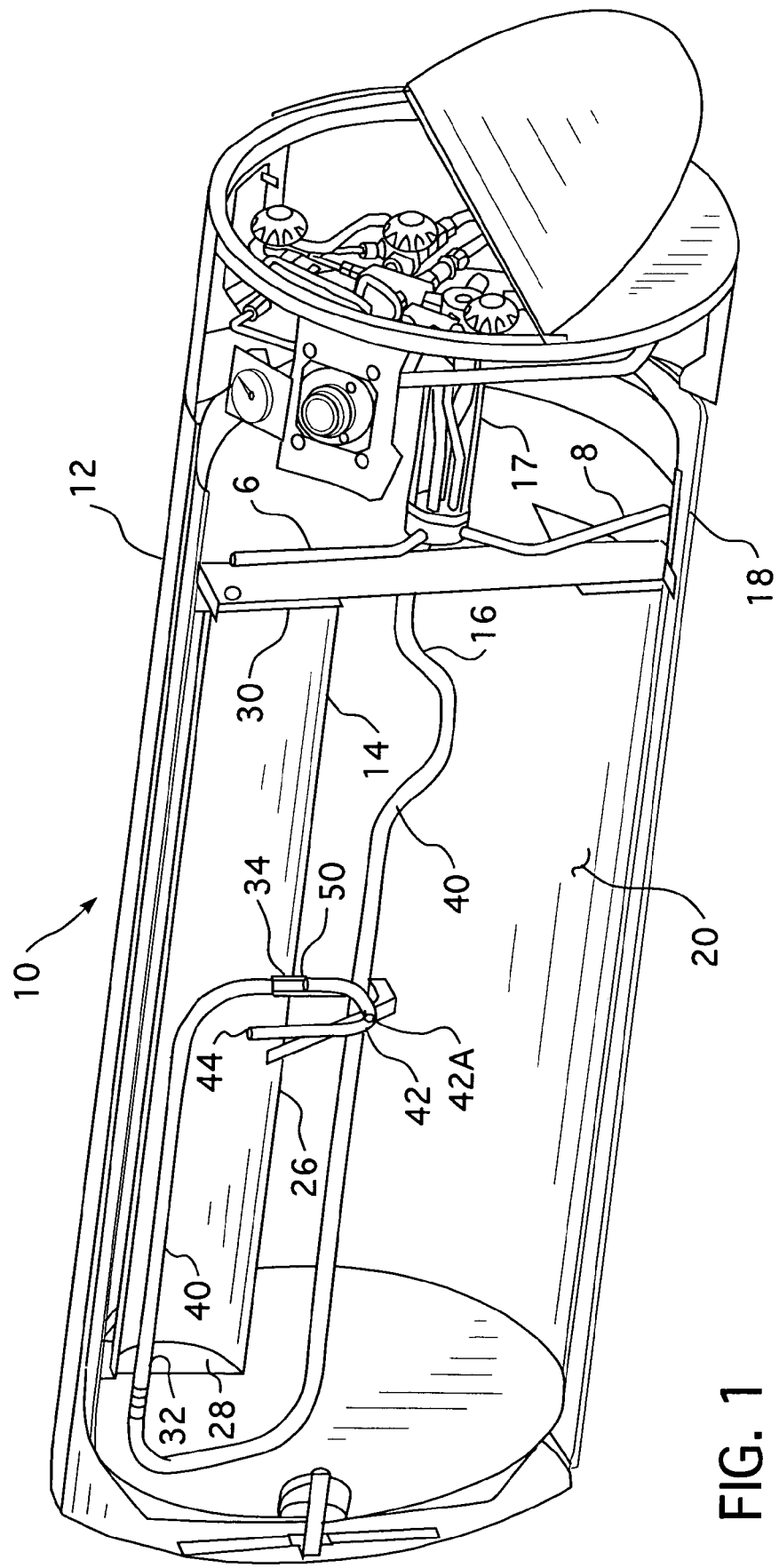
FIG. 1 is an isometric view of a cryogenic vessel according to the present invention.
Figure 3:
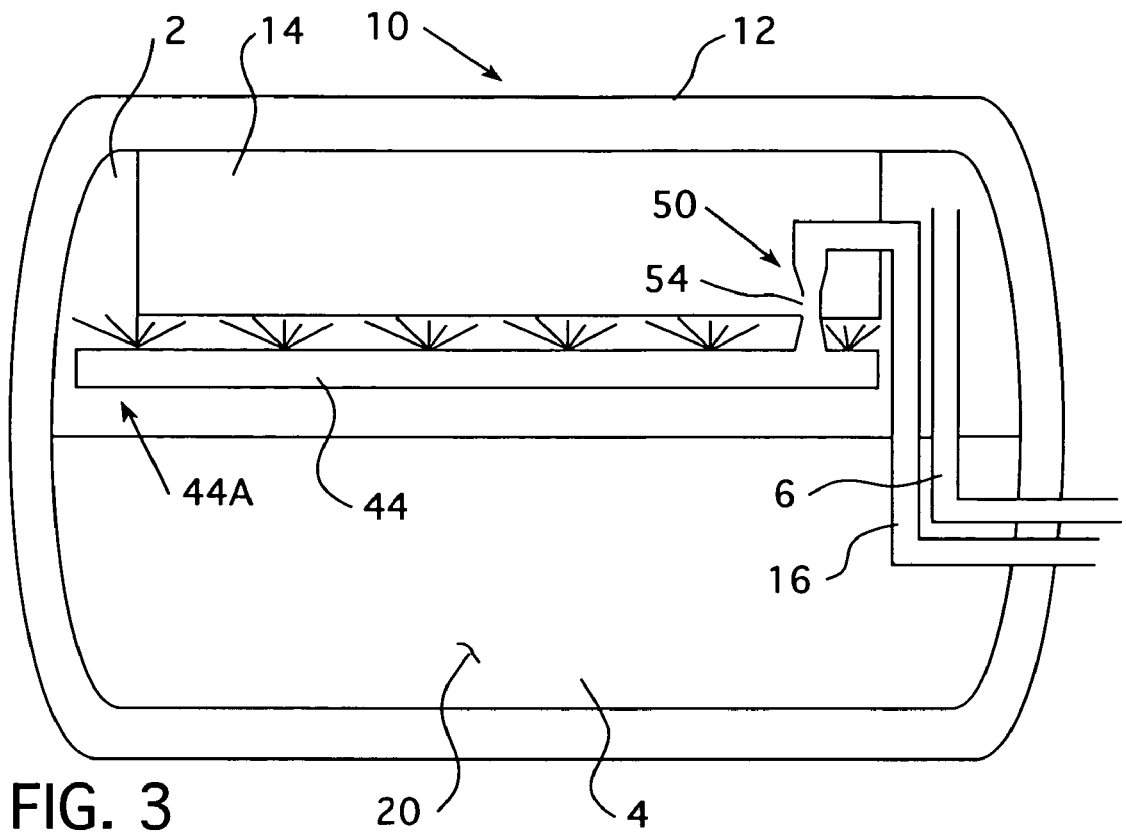
FIG. 3 is a schematic view of the present invention including a spray head.

As shown in FIG. 1, a cryogenic vessel 10 includes a first, outer vessel assembly 12 and a second, ullage space vessel 14. The outer vessel assembly 12 includes a fill line assembly 16, a port assembly 17 and an outer vessel 18 structured to hold a cryogenic liquid as is known in the art. That is, the outer vessel assembly 12 is a double walled vessel with an insulating layer, preferably a vacuum, between the layers. The outer vessel 18 defines a storage space 20 that, when filled includes a vapor space 2 and a liquid space 4 (FIG. 3). The outer vessel 18 further includes a vent line 6 and a withdraw line 8. The vent line 6 extends into the vapor space 2 and the withdraw line 8 extends to a point adjacent to the bottom of the storage space 20. The port assembly 17 allows various lines, such as a vent line, a drain line and the fill line assembly 16 to pass through the outer vessel 18. The fill line assembly 16 is structured to be coupled to a supply vessel (not shown) to deliver a cryogenic liquid into the storage space 20 as described below.

The ullage space vessel 14 is a single walled second vessel defining an ullage space 22. The ullage space vessel 14 is mounted within the outer vessel 18 and disposed at the top of the outer vessel 18. The ullage space vessel 14 is preferably cylindrical, having a sidewall 26 and a first and second end plates 28, 30. The ullage space vessel 14 is mounted within the outer vessel 18 with the longitudinal axis extending generally horizontally. As used herein, the "bottom" of the ullage space vessel 14 refers to the lowest point of the ullage space vessel 14. The ullage space vessel 14 has two openings therein; a first opening 32 is located on an end plate, the first end plate 28 as shown, and a second opening 34 through the sidewall 26. The second opening 34 through the sidewall 26 is disposed at the bottom of the ullage space vessel 14.

The fill line assembly 16 includes a first portion 40, a second portion 42 and a venturi assembly 50. The fill line first portion 40 extends from the port assembly 17 through the storage space 20 and passes through the ullage space vessel first opening 32. The first opening 32 is sealed about the fill line first portion 40. The fill line first portion 40 further extends through the ullage space vessel 14 to the venturi assembly 50 (described below). The venturi assembly 50 is disposed within the ullage space vessel second opening 34 and provides a conduit therethough. The fill line second portion 42 is coupled to the venturi assembly 50 outside of the ullage space vessel 14. The fill line second portion 42 may have a drain opening 42A. The distal end 41 of the fill line assembly second portion 42 opens into the storage space 20. Each of the fill line assembly first portion 40, venturi assembly 50 and fill line assembly second portion 42 are in fluid communication with each other so that a cryogenic liquid that enters the fill line assembly 16 at the port assembly 17 may travel through the fill line assembly into the storage space 20.

Figure 2:
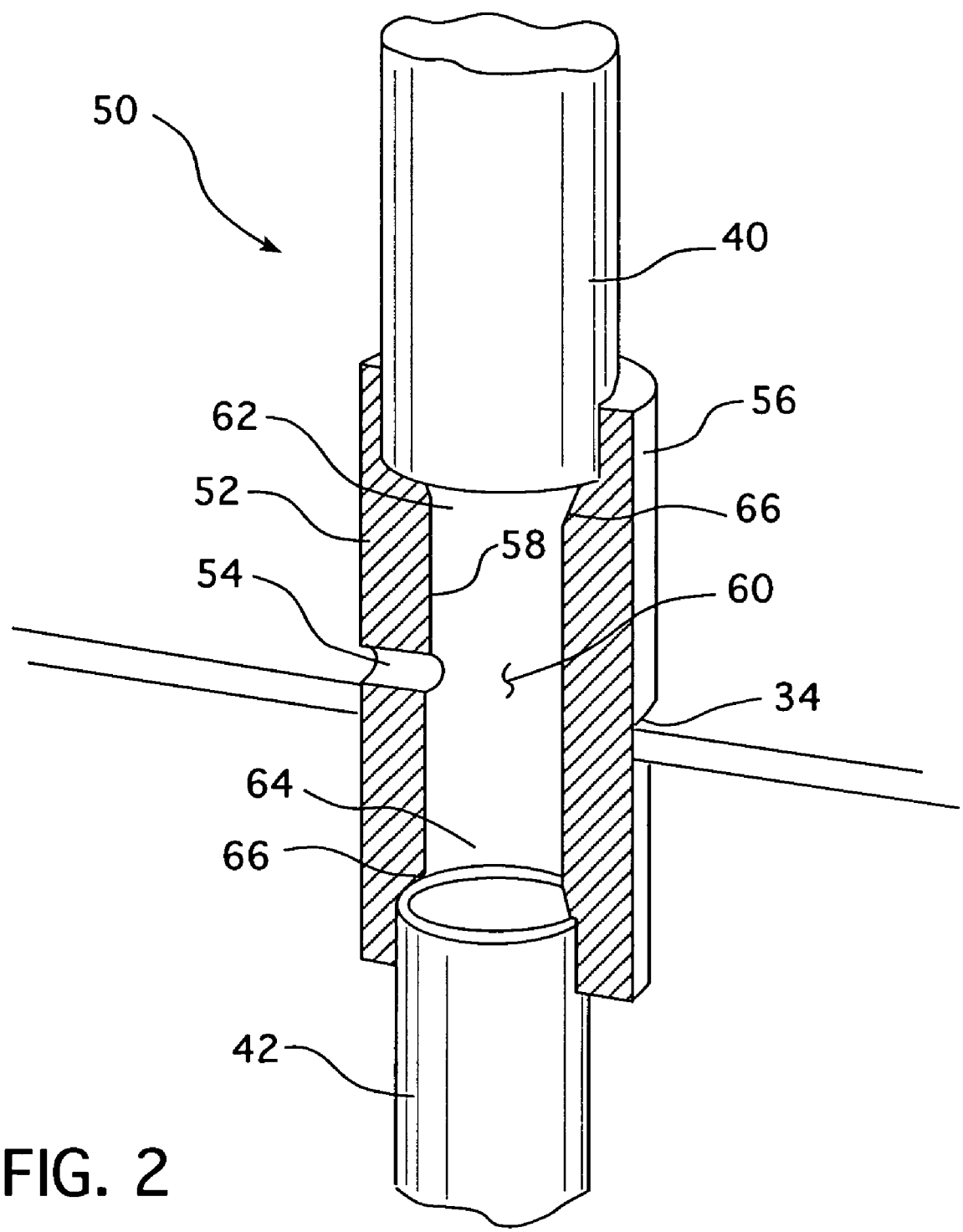
FIG. 2 is a detailed isometric view of the venturi assembly.

As shown in FIG. 2, the venturi assembly 50 includes an elongated tubular body 52 having a venturi opening 54 therethrough. The tubular body 52 has an outer surface 56 and an inner surface 58 generally having an hour-glass shape. The inner surface 58 defines a conduit 60 that extend longitudinally though the body 52. The conduit has a first end 62 and a second end 64. The first and second conduit ends 62, 64 are structured to engage the fill line assembly first portion 40 and fill line second portion respectively. The conduit 60 has a first diameter and the fill line assembly first portion 40 and fill line assembly second portion 42 each have a second diameter. The conduit 60 first diameter is smaller than the fill line second diameter. There may be sloped transition portions 66 of the inner surface 58 adjacent to the first and second conduit ends 62, 64. The venturi opening 54 extends generally perpendicularly to the conduit 60. The venturi opening 54 extends between the outer surface 56 and the inner surface 58, that is, through the tubular body 52. The venturi assembly 50 is disposed in the second opening 34 so that the venturi opening 54 is disposed adjacent to the bottom of the ullage space vessel 14.

In operation, the filling procedure is as follows. The first time the outer vessel assembly 12 is filled, both the outer vessel assembly 12 and the ullage space vessel 14 are empty. The cryogenic liquid from a supply vessel passes through the fill line assembly 16 and into the storage space 20. As shown in FIG. 3, the distal end 41 of the fill line assembly second portion 42 may include a spray head 44. The spray head 44 may include a drain opening 44A (FIG. 3). When the level of cryogenic fluid in the storage space 20 falls below the level of the drain opening 44A, fluid flows from the ullage space vessel 14 into the storage space 20. When the cryogenic liquid enters the storage space 20 from the fill line assembly second portion 42 or the spray head 44 the cryogenic liquid, which is typically sub-cooled, i.e. colder than the normal storage temperature for the cryogenic liquid, collapses the pressure head in the storage space 20. During the fill, cryogenic liquid passing through the venturi assembly 50 and, more specifically, through the narrow conduit 60, moves at an increased speed relative to the flow through the fill line assembly first and second portions 40, 42. The increased speed of flow creates a low pressure zone in the venturi assembly 50 relative to the pressure in the ullage space vessel 14. As such, the cryogenic liquid does not flow out of the venturi opening 54 into the ullage space vessel 14 and, instead, the flow of fluid occurs in the other direction. That is, fluid from the ullage space vessel 14 is drawn into the fill line assembly 16. When the storage space 20 is filled with the cryogenic liquid, there is a dramatic increase in pressure in the fill line assembly 16 indicating that the outer vessel assembly 12 is full. At this point the filling procedure is terminated with the storage space 20 substantially filled with cryogenic liquid and the ullage space vessel 14 essentially empty. Because the ullage space vessel 14 is single wall and disposed within the filled storage space 20, the cryogenic liquid causes the pressure head in the ullage space vessel 14 to collapse. At this point, gravity causes the cryogenic liquid from within the fill line assembly 16 to flow into the ullage space vessel 14. Additionally, cryogenic liquid from within the storage space 20 may back flow through the fill line assembly 16 into the ullage space vessel 14. Thus, an ullage space, or vapor space 2 exists above the liquid space 4. The vapor space 2 will accommodate a quantity of vapor that evaporates from the cryogenic liquid, thereby delaying the need to vent to gas.

Cryogenic liquid is withdrawn from the outer vessel assembly 12 through the withdraw line 8. While the level of cryogenic liquid is above the distal end 41 of the fill line assembly second portion 42 or spray head 44 and the cryogenic liquid is being withdrawn from the storage space 20, a portion of the cryogenic liquid within the ullage space vessel 14 may be siphoned into the storage space 20. Once the level of cryogenic liquid falls below the distal end 41 of the fill line second portion 42 or spray head 44, any cryogenic liquid within the ullage space vessel 14 drains through the drain opening 42A or spray head drain opening 44A.

During a filling procedure where there is cryogenic liquid within the ullage space vessel 14 and/or a saturated gas, the venturi assembly 50 acts to empty the cryogenic liquid and any vapor from the ullage space vessel 14. That is, as described above, the flow of the cryogenic liquid through the venturi assembly 50 creates a low pressure zone within the venturi assembly 50. However, because the venturi opening 54 is disposed adjacent to the bottom of the ullage space vessel 14, and is therefore submerged below the level of cryogenic liquid in the ullage space vessel 14, the low pressure zone acts to draw the any fluid within the ullage space vessel 14 into the venturi assembly 50. During a filling procedure, the liquid filling the cryogenic vessel 10 is sub-cooled and may absorb or condense some of the vapor from within the ullage space vessel 14. When the cryogenic liquid or gas from within the ullage space vessel 14 passes through the venturi opening 54, the cryogenic liquid or gas, joins the flow within the fill line assembly 16 and is delivered to the storage space 20. Thus, the venturi effect causes the ullage space vessel 14 to be substantially drained of all cryogenic fluid and a substantial amount of vapor during the fill procedure. When the fill procedure is complete, the substantially empty ullage space vessel 14 provides the proper amount of ullage space. It is further noted that fluid may also be withdrawn from the vessel through the withdraw line assembly 16. When this occurs, the reverse flow through the venturi assembly 50 also creates a low pressure zone and draws fluid from within the ullage space vessel 14 into the fill line assembly 16.

Figure 4:
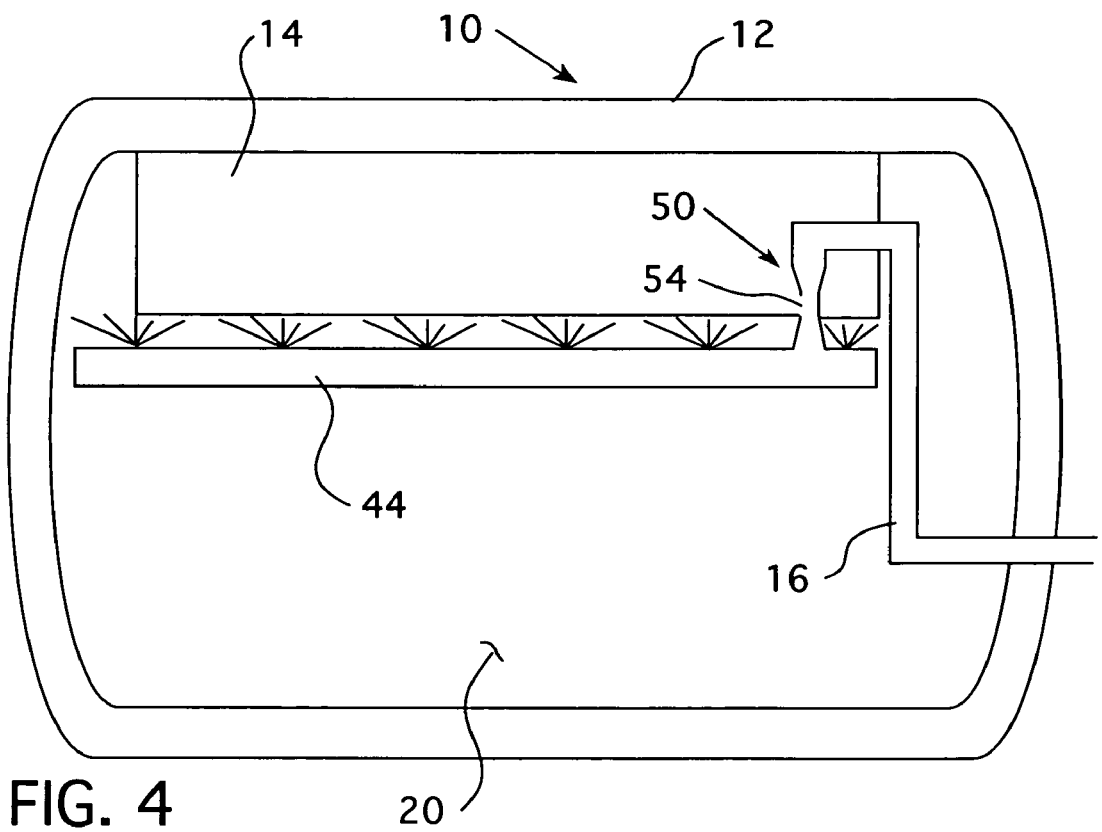
FIG. 4 is a schematic view of an alternate embodiment.
Figure 5:
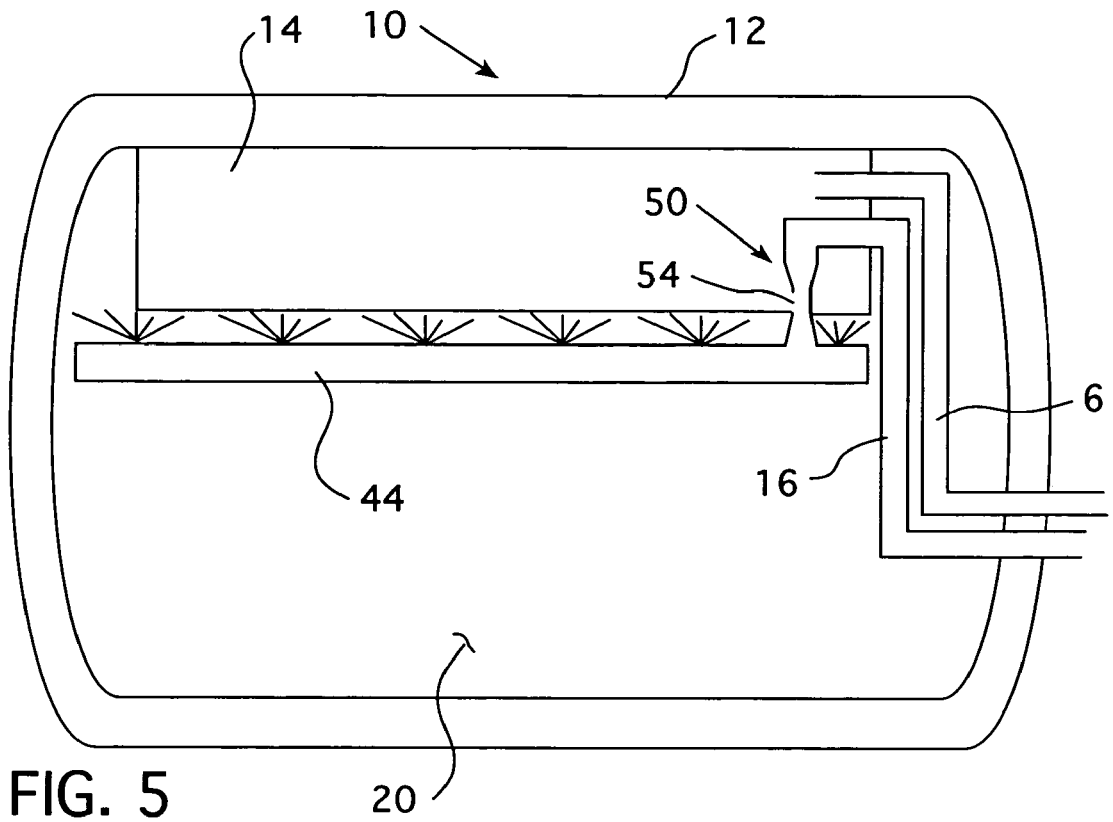
FIG. 5 is a schematic view of an alternate embodiment.
Figure 6:
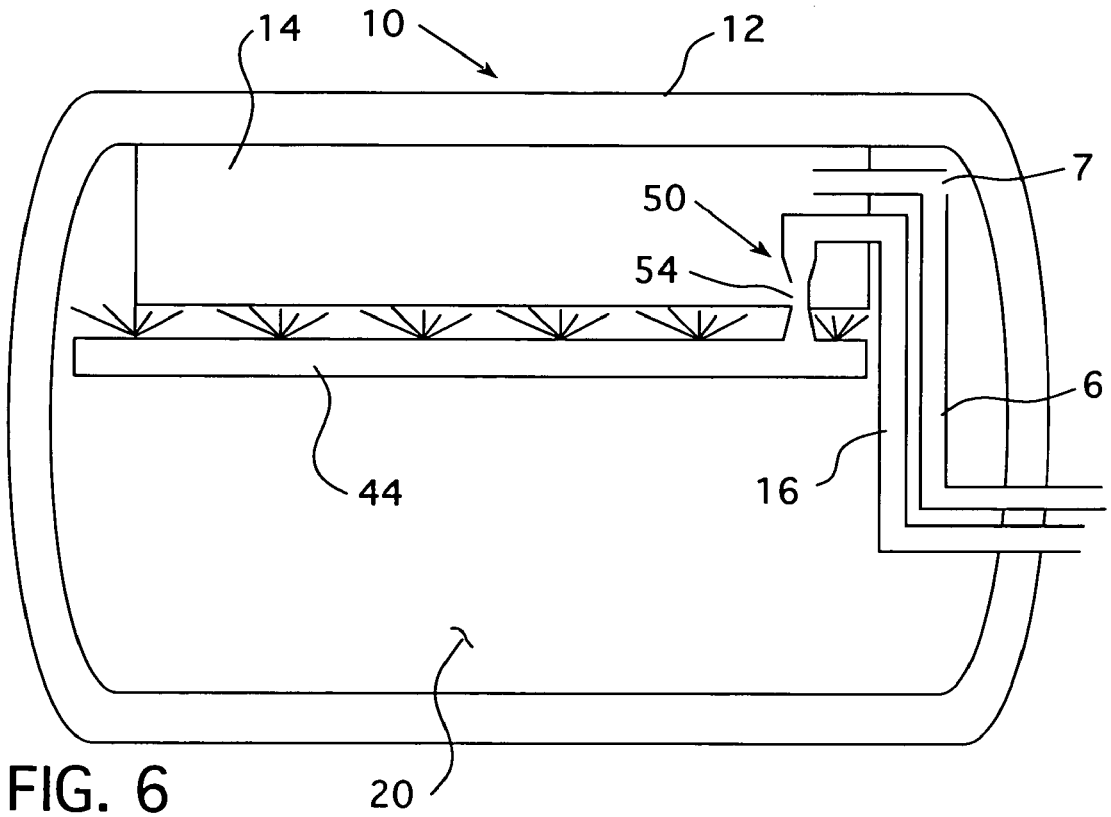
FIG. 6 is a schematic view of an alternate embodiment.
Figure 7:
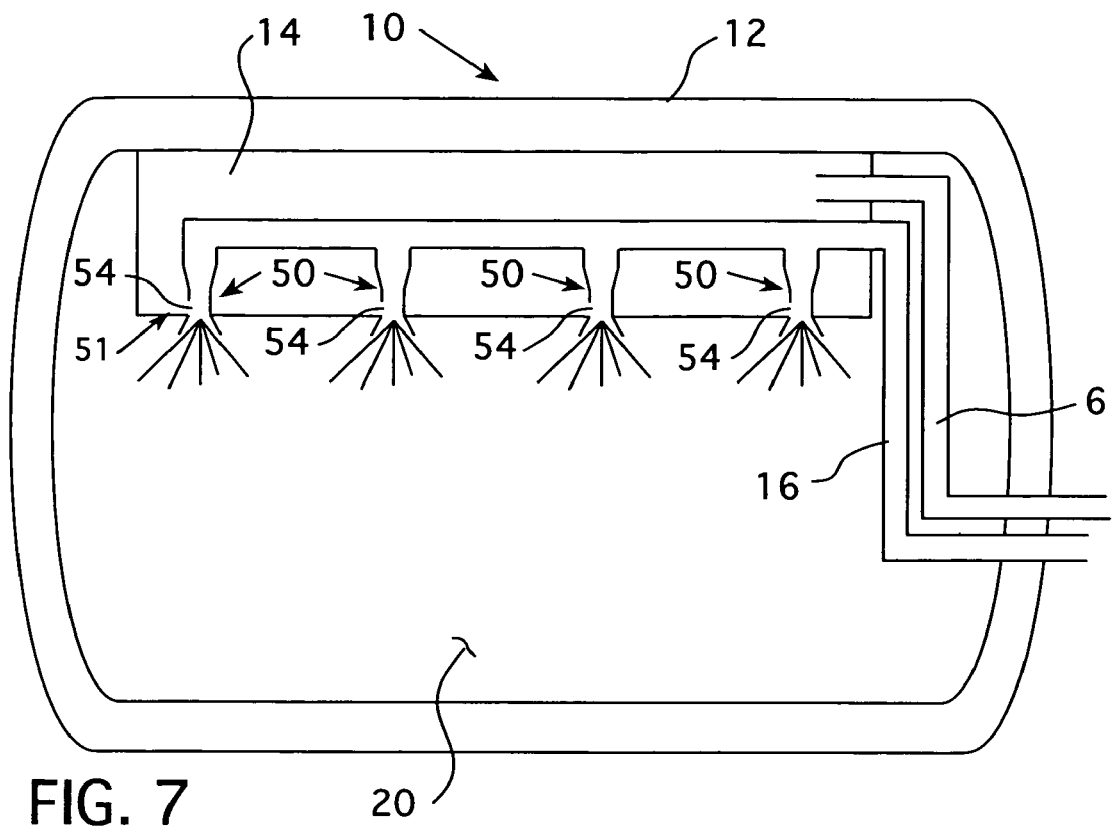
FIG. 7 is a schematic view of an alternate embodiment.

A schematic representation of the cryogenic vessel 10 described above is shown in FIG. 3 at a point midway through the filling procedure. The withdraw line 8 is also not shown in FIGS. 4–8. FIGS. 4–8 show alternative embodiments of the cryogenic vessel 10, accordingly like elements will use the same reference numbers as those identified above. In FIG. 4, the cryogenic vessel 10 is substantially similar to the system described above except the cryogenic vessel 10 does not include a vent line 6. In FIG. 5, the cryogenic vessel 10 includes a vent line 6 that extends into the ullage space vessel 14 instead of into the storage space 20. In FIG. 6, the cryogenic vessel 10 includes a vent line that extends into the ullage space vessel 14, and further includes a storage space opening 7 whereby gas within the vapor space of the ullage space vessel 14 or the storage space 20 may also be vented. As shown in FIG. 7, the ullage space vessel 14 may have a plurality of openings 43 shown as a second, third, fourth and fifth openings, 42A, 42B, 42C, and 42D along the bottom of the ullage space vessel 14. This embodiment further includes a plurality of venturi assemblies 51. Each opening of the plurality of openings 43 includes one venturi assembly 50 from the plurality of venturi assemblies 51. Each venturi assembly 50 extends through the bottom of the ullage space vessel 14 and acts as a spray device, thereby eliminating the need for a spray head 44.

Figure 8:
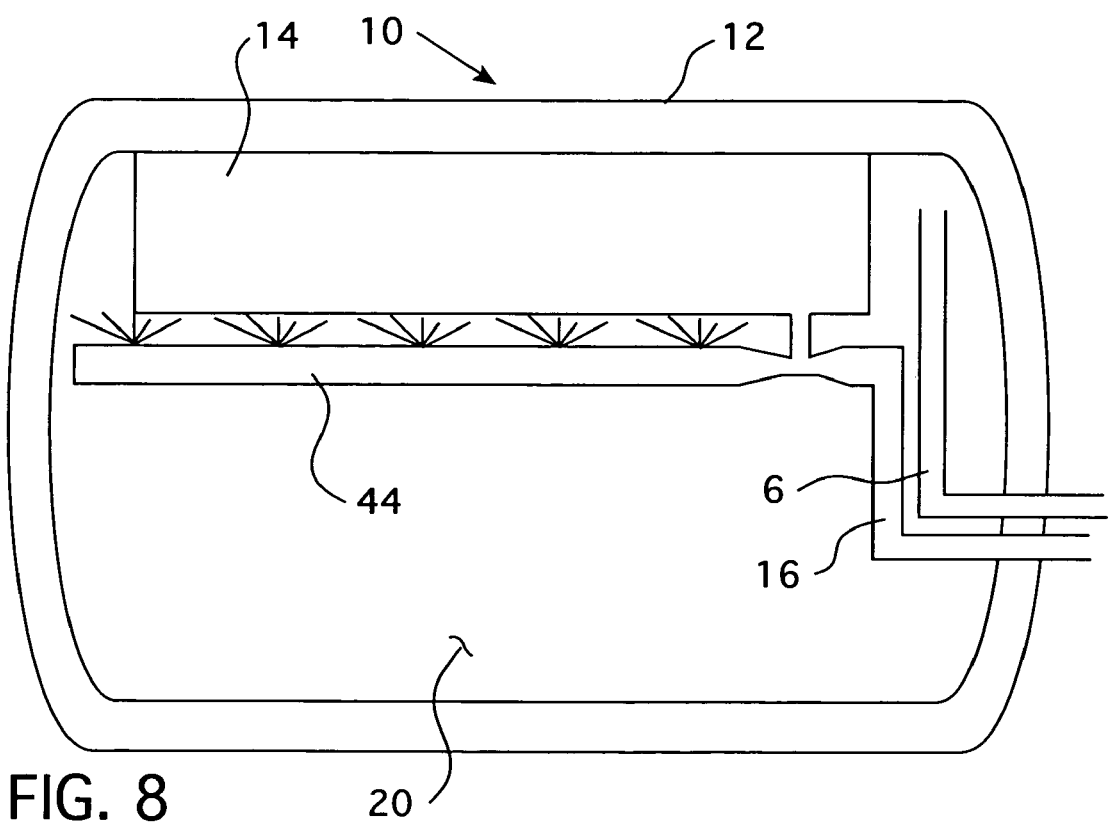
FIG. 8 is a schematic view of an alternate embodiment.

The cryogenic vessel 10 shown in FIG. 8 is different in that the fill line assembly 16 does not extend through the ullage space vessel 14. Instead, the fill line assembly 16 extends through the storage space 20 below the ullage space vessel 14. The fill line assembly 16 still has a first portion 40, a second portion 42 and a venturi assembly 50 therebetween. The ullage space vessel 14 has a lower opening 45 located at the bottom of the ullage space vessel 14. The lower opening is in fluid communication with a drain pipe 47. The drain pipe 47 is in further communication with the venturi opening 54. The drain pipe 47 is, preferably, short so that the venturi assembly is adjacent to the bottom of the ullage space vessel 14. As such, similar to the embodiments above, the venturi assembly 50 is structured to remove any fluid from within the ullage space vessel 14 during the fill procedure. That is, as cryogenic liquid is passing through the fill line assembly 16, the cryogenic liquid passing through the venturi assembly 50 creates a low pressure zone that acts to suction any fluid out of the ullage space vessel 14.

While specific embodiments of the invention have been described in detail, it will be appreciated by those skilled in the art that various modifications and alternatives to those details could be developed in light of the overall teachings of the disclosure. For example, the fill line first portion 40 and the fill line second portion 42 may have different diameters, or, the spray header 44 may be replaced with a nozzle, a deflector or other such device. Accordingly, the particular arrangements disclosed are meant to be illustrative only and not limiting as to the scope of invention which is to be given the full breadth of the claims appended and any and all equivalents thereof.

What is claimed is:
1. A cryogenic vessel comprising:
    a first, outer vessel assembly having an outer vessel and a liquid fill line assembly;
    a second, ullage space vessel having a bottom and disposed within said first, outer vessel;
    said liquid fill line assembly having a venturi assembly adjacent to, and in fluid communication with, the bottom of said ullage space vessel; and said venturi assembly structured to create a low pressure zone, relative to said ullage space vessel during a fill procedure whereby, during a fill procedure, fluid is drawn from said ullage space vessel into said fill line assembly.

2. The cryogenic vessel of claim 1, wherein said fill line assembly extends through said ullage space vessel.

3. The cryogenic vessel of claim 2, wherein:
said venturi assembly includes a tubular body having an inner surface with a first diameter, an outer surface, and a venturi opening;
said venturi opening in fluid communication with said ullage space vessel; and
said fill line assembly having a second diameter, wherein said venturi assembly first diameter is smaller than said fill line assembly second diameter.

4. The cryogenic vessel of claim 3, wherein said venturi opening is disposed adjacent to the bottom of the ullage space vessel.

5. The cryogenic vessel of claim 4, wherein:
said ullage space vessel having a first and a second opening in said ullage space vessel sidewall;
said second opening disposed at the bottom of said ullage space vessel sidewall;
said fill line assembly further includes a first portion and a second portion;
said first portion extending through said ullage space vessel and coupled to said venturi assembly;
said venturi assembly extending through said ullage space vessel second opening; and
said second portion coupled to said venturi assembly and extending outside of said ullage space vessel.

6. The cryogenic vessel of claim 5, wherein said second pipe portion includes a spray head.

7. The cryogenic vessel of claim 1, wherein:
said venturi assembly includes a tubular body having an inner surface with a first diameter, an outer surface, and a venturi opening;
said venturi opening in fluid communication with said ullage space vessel; and
said fill line assembly having a second diameter, wherein said venturi assembly first diameter is smaller than said fill line assembly second diameter.

8. The cryogenic vessel of claim 7, wherein said venturi opening is disposed adjacent to the bottom of the ullage space vessel.

* * * * *